Jan. 19, 1960   R. I. KREISLER ET AL   2,921,972
HEAT SENSING APPARATUS
Filed Dec. 27, 1956

INVENTORS
WILLIAM A. HAKALA &
ROBERT I. KREISLER
BY
Walter J. Jason
ATTORNEY

United States Patent Office 2,921,972
Patented Jan. 19, 1960

2,921,972

HEAT SENSING APPARATUS

Robert I. Kreisler, San Diego, and William A. Hakala, La Mesa, Calif., assignors to General Dynamics Corporation, San Diego, Calif., a corporation of Delaware Application December 27, 1956, Serial No. 630,937

5 Claims. (Cl. 136—4)

This invention relates to radiant energy measuring devices and more particularly to an instrument for measuring radiant heat at selected points in the calibration of radiant heat furnaces.

One form of radiant energy receiving device uses a dark heat-absorbing substance sensitive to radiant energy over a wide range of wavelengths for frequencies. This substance is enclosed in a chamber covered with a diaphragm which is influenced by pressure changes induced by the substance when radiant energy is received. Another radiant energy receiving means detects radiant heat from a reflected surface to a thermocouple positioned at a focal point. These devices, however, are for the detection of thermal radiation from bodies which are of different temperature from their surroundings, and for measuring radiation from a distant emitter such as a star, or for infra-red signaling through fog, for example. These detection devices however are not adapted to the measurement of rate of heat transfer by radiation to a selected area or position to determine the rate of heating or total heat to which a test component is exposed or for furnace calibration purposes. These are examples of functions for which the calorimeter comprising the present invention may be utilized.

In the field of guided missiles, components are subjected to heating which sometimes causes structural failures and breakdown. In attacking this problem a radiant heat furnace was built comprising a row of infra-red quartz lamps which heat the test component by thermal radiation. It is desirable to know the rate of energy transfer by radiation from these lamps, rate of radiant energy transfer to a component, and the total amount of radiant energy transferred to a component. To do this a calorimeter is mounted in the sample or simulated sample component so that the face of the calorimeter disk is in the same plane as the sample. The calorimeter consists of a small copper disk surrounded by a heat shield to minimize convection and radiation losses. A thermocouple is installed in the disk for indicating temperature change. These three components are combined to effect a measurement of the radiant energy. The disk has known thermal properties, that is, emissivity, specific heat, mass, and area. By measuring the temperature rise with time, and knowing the size, mass, specific heat and emissivity of the disk it is possible to determine the rate of energy transfer, and/or the amount of energy absorbed by the calorimeter. Since the calorimeter is in the same plane as the test components (of known emissivity) at the various positions in the furnace, the energy transfer rate and energy absorption of missile structures exposed to simulated aerodynamic heating, exhaust or flame radiation can be computed.

It is therefore an object of this invention to provide an instrument for measuring radiant energy.

Another object is the provision of an instrument for calibrating a radiant heat furnace.

Another object is the provision of a radiant energy receiving instrument having maximum radiant energy absorption and a minimum of radiant energy losses.

Another object is the provision of a radiant energy measuring instrument comprising a thermocouple swaged into a heat receiving body of known thermal properties surrounded by a heat reflecting shield spaced therefrom for minimizing radiation losses, to avoid a conduction heat factor, and to prevent convection currents around the body.

Still another object is the provision of a radiant energy measuring device of sufficiently small size to be mounted in a test component and having a heat receiving element in the plane of the surface of the component to be subjected to aerodynamic heating.

Other objects and features of the present invention will be readily apparent to those skilled in the art from the following specification and appended drawings wherein is illustrated a preferred form of the invention, and in which.

Figure 1:
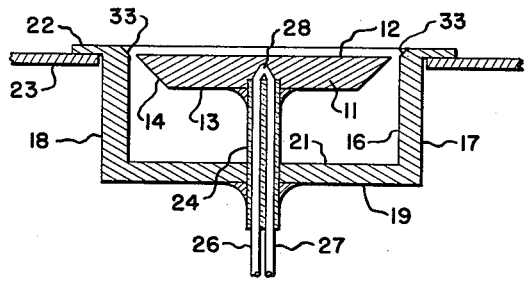
Figure 1 is a cross-sectional view of the radiant energy receiving device.

Referring now to Figure 1 there is shown a heat receiving copper disk 11 whose face 12 is coated with a heat absorbing substance, such as a dull black enamel for example, so that the emissivity of the disk approaches unity. The back surface 13 of disk 11 is highly polished to form a heat barrier to prevent the dissipation of heat from the disk or absorption of heat by the lower surface of the disk. The edge 14 of the disk is tapered inwardly so that radiation from the source will not impinge on any surface other than face 12. This also provides a very small edge of the disk to be in close proximity with the shield, thereby preventing conduction or radiation of heat between the disk and the shield. Edge 14 may be gold plated and polished in a similar manner to the back surface 13. The junction of front surface 12 with edge 14 is in very close proximity with the inner surface 16 of the upright walls 17 of a copper shield 18. This prevents the flow of convection currents behind the disk and heat losses resulting therefrom. These walls are joined by a base 19 which is parallel to the back surface 13. The inner surface 21 of base 19 and the inner surface 16 of walls 17 are also highly polished to provide maximum reflection to the disk 11 of any heat radiated therefrom. This acts as a heat barrier to prevent heat radiation from the disk to the inner surfaces and vice-versa. A thin wide collar 22 on shield 18 is used to position the device within a test component 23. Surface 33 of the collar is tapered inwardly so that there will be no obstruction to the surface of face 12. The face 12 of disk 11 is recessed from the top of the shield walls by an amount equal to the thickness of the collar 22 so as to lie in the plane of the outer surface of the component 23. This is done by mounting the disk on a two hole ceramic rod 24 which extends through, and is fastened to, the base 19 of shield 18. Within the holes in rod 24 are inserted thermocouple elements 26, 27 such as iron and constantan which are connected together to form a thermocouple bead 28. This bead is swaged into the approximate center of disk 11 in a manner to form a good heat transfer connection therewith.

Figure 2:
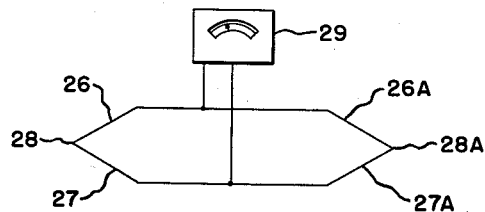
Figure 2 is a schematic of the measuring instrument.

As shown in Figure 2, the other end of the thermocouple conducting elements 26, 27 are connected to similar elements 26A, 27A which in turn are connected to form another thermocouple bead 28A. This bead 28A is maintained at a constant temperature, usually 32° F. In accordance with known thermocouple principles, a voltage is generated proportional to the difference in temperature between the two beads 28 and 28A. A readout device 29 is responsive to this generated voltage and may be calibrated to read temperature, or since temperature is the only variable in solving radiant energy equations for a particular calorimeter, the readout 29 may be calibrated in terms of total heat absorbed by the disk 11.

Figure 3:
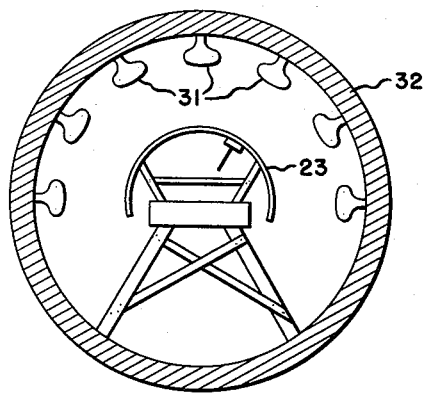
Figure 3 illustrates how the instrument is used in the calibration of a heat furnace.

Figure 3 shows a row of infra-red quartz lamps 31 positioned within a furnace structure 32 in a manner to conform with the general contour of the missile component 23 under test. In this manner the outer surface of the component is exposed to a uniform heat intensity the value of which is measured through the disk 11 and its associated thermocouple components and circuitry.

While the following specifications will be helpful in enabling one skilled in the art to practice this invention, it is to be understood that these are not considered to be limitations thereof. The disk 11 has a 1.000" diameter across its face 12 and is 1/8" thick. The degree of taper of edge 14 and surface 33 is approximately 45°. The shield 18 has an inner diameter opening of 1.063" and is 17/32" deep from the surface of collar 22 to the outer surface of base 19. The outer diameter of the collar is 1½" and the outer diameter of the shield walls is 1¼". The collar is 1/32" thick, the amount of the recess of disk face 11 from the collar surface. The ceramic rod 24 has a 1/16" diameter, the thermocouple elements are No. 26 gauge and bead 28 is set 1/16" deep in the disk 11. The inner walls of shield 18 have a 16 microinch polish and the back surface and edge of disk 14 are gold plated and have an 8 microinch polish.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What we claim is:

1. A radiant energy measuring device comprising a heat receiving member having a heat absorbing face and a heat retaining back surface and side surfaces, said side surfaces being tapered rearwardly such that the area of said back surface is less than the area of said face, a heat sensing element responsive to temperature changes of said member, said element being embedded into said member from said back surface, and a shield having side walls in close proximity to the side edges of said member to prevent passage of convection currents therebetween, said side edges and said side walls being polished to form a heat passage barrier therebetween, and a heat resistive member connecting said heat receiving member to said shield.

2. A radiant energy measuring device comprising a disk having a heat absorbing face and heat retaining back and side surfaces, a shield having upright walls in close proximity to said side surfaces and a base portion between said walls, said shield having all inner surfaces highly polished to reflect heat back to said disk, connecting means between said base portion and said back surface for supporting said disk in spaced relation to said base and said walls, and a heat sensing element swaged into said disk for sensing heat received thereby, said heat sensing element including a bead formed by connecting together two conductors of dissimilar material, said bead being swaged into said disk from said back surface, said connecting means having an opening therein, said conductors extending from said bead through said opening, said disk having a recessed portion in said back surface to receive said connecting means, said connecting means thereby spacing said conductors from said disk from the base of said bead to said back surface.

3. A radiant energy measuring device comprising a heat receiving member, a shield therearound, connecting means for maintaining said member and said shield in spaced relation, and a heat sensing element responsive to temperature changes of said member, said heat receiving member having a heat absorbing face and a heat retaining back surface and side surfaces such that emissivity thereof approaches unity, said side surfaces being tapered inwardly to avoid heat radiation absorption thereby and to present only a very small edge surface in close proximity to said shield therearound, said shield having side walls in close proximity to said side surfaces to prevent convection currents therebetween, a base portion between said side walls, said shield having polished inner surfaces to form a heat transfer barrier and to reflect heat radiated from said member, said shield having a thin wide mounting collar for positioning said shield in an aperture of a test surface, said connecting means comprising a ceramic rod extending through an opening in said base and extending into a suitable recess in the back surface of said member, openings extending through said rod for insertion of thermocouple elements therethrough, said rod spacing said member from said base a sufficient length to permit the face of said member to lie in the same plane as said test surface, a thermocouple mounted in said rod and having the bead thereof swaged into the center of said member.

4. A radiant energy measuring device comprising a heat receiving member, a shield therearound, connecting means for maintaining said member and said shield in spaced relation, and a heat sensing element responsive to temperature changes of said member, said heat receiving member having a heat absorbing face and a heat retaining back surface and side surfaces such that emissivity thereof approaches unity, said shield having side walls and a base portion between said side walls, said shield having polished inner surfaces to form a heat transfer barrier and to reflect heat radiated from said member, said connecting means extending through an opening in said base and extending into a suitable recess in the back surface of said member, said connecting means spacing said member from said base a sufficient length to permit the face of said member to lie in the same plane as said test surface, a thermocouple mounted in said connecting means and having the bead thereof swaged into the center of said member.

5. A radiant energy measuring device comprising a heat receiving member, a shield therearound, connecting means for maintaining said member and said shield in spaced relation, and a heat sensing element responsive to temperature changes of said member, said heat receiving member having a heat absorbing face and a heat retaining back surface and side surfaces such that emissivity thereof approaches unity, said side surfaces being tapered inwardly to avoid heat radiation absorption thereby and to present only a very small edge surface in close proximity to said shield therearound, said shield having side walls in close proximity to said side surfaces to prevent convection currents therebetween, a base portion between said side walls, said shield having polished inner surfaces to form a heat transfer barrier and to reflect heat radiated from said member, said connecting means comprising a rod extending through an opening in said base and extending into a suitable recess in the back surface of said member, openings extending through said rod for insertion of thermocouple elements therethrough, said rod spacing said member from said base a sufficient length to permit the face of said member to lie in the same plane as said test surface, a thermocouple mounted in said rod and having the bead thereof swaged into the center of said member.

References Cited in the file of this patent

UNITED STATES PATENTS

| 2,635,468 | Field et al. | Apr. 21, 1953 |
| 2,707,881 | Gier et al. | May 10, 1955 |
| 2,768,527 | Stern et al. | Oct. 30, 1956 |

OTHER REFERENCES

Article: Radiation Intensities and Heat Transfer etc. by Crott et al. (addenda) in transactions ASMB, vol. 58, 1936, page 117.